Patented Sept. 7, 1937

2,091,950

UNITED STATES PATENT OFFICE 2,091,950

PROCESS FOR THE PREPARATION OF ALLOYS CONTAINING BORON

Jean Lucien Andrieux, Grenoble, France, assignor to Société d'Electrochimie, d'Electrometallurgie et des Acieries Electriques d'Ugine, Paris, France, a corporation of France No Drawing. Application June 27, 1935, Serial No. 28,774. In France July 2, 1934

3 Claims. (Cl. 75—122)

The present invention relates to a process for the manufacture of alloys containing boron, starting from alkaline earth borides, such in particular as the borides of calcium or barium.

It has been found in fact according to the invention that the alkaline earth borides are capable of reacting upon the majority of metals or their alloys as well as upon their oxides or their halogenated salts, thereby producing alloys containing boron which, when the operation is performed in the presence of a flux, generally contain only a very small proportion of the alkaline earth metal associated with the boron in the boride employed.

Preferably the metal to be alloyed with the boron or the alloy into which it is desired to introduce boron is mixed in the divided state with a calculated quantity of an alkaline earth boride, depending on the quantity of boron which is to be alloyed with the metal, and the whole is brought, under a layer of flux, to a temperature sufficient to obtain the final alloy in the molten state.

Instead of using the metal or the metals to be alloyed with boron in metallic form, they may also, according to the invention, be used in the form of oxides or salts which are treated by a reducing agent in the presence of a suitable quantity of an alkaline earth boride.

For the reduction, either the reducing agents habitually employed, aluminium, magnesium, calcium, sodium, silicon, carbon, etc., may be used or the alkaline earth boride itself. In the first case the proportions of the constituents of the charge should be calculated so that the quantity of reducing agent is sufficient to reduce the metallic oxides or salts, and so that the quantity of the alkaline earth boride permits the desired proportion of boron to be introduced into the final alloy. In the second case the quantity of boride should obviously be sufficient both to reduce the oxides or salts of the mixture and also to form with the metal or metals thus liberated an alloy having the desired content of boron.

The reaction takes place as may be desired either in an electric furnace like an ordinary reduction or in a refractory crucible like an aluminothermic reduction.

The following non-limiting examples illustrate several of the methods of application of the invention:—

Example 1

To prepare an alloy of iron and boron by direct union, iron filings are mixed with a determined quantity of calcium or barium boride; this mixture is placed in a refractory crucible and is covered with a layer of flux constituted for example by anhydrous borax or boric anhydride. The crucible is then brought in the electric furnace to the temperature desired for producing the fusion of all the contents of the said crucible. The alloy obtained is then poured into ingot moulds.

It is possible to prepare by this process alloys with different boron contents, this content depending obviously on the relative proportions of the metal and of the boride introduced into the mixture. For obtaining, for example, a ferroboron with about 10% of boron, the charge is constituted by a mixture of 90 parts of iron filings and 20 parts of calcium boride, which mixture is brought to about 1500° C.

Example 2

To prepare ferroboron with about 10% of boron starting from iron oxide $Fe_2O_3$, by using as reducing agent an alkaline earth boride such as calcium boride, there are mixed 50 parts of iron oxide and 20 parts of calcium boride, and the mixture is heated to a temperature sufficiently high to produce the reduction (about 1000° C.). The heat evolved by the reaction being insufficient to fuse the alloy obtained, the product is then brought to about 1500° C.

Example 3

To prepare ferroboron with about 10% of boron starting from iron oxide $Fe_2O_3$, by using a reducing agent such as aluminium for example, 160 parts of iron oxide, 27 parts of pulverized aluminium and 22 parts of calcium boride are mixed. One part of this mixture is placed in a refractory crucible or in an electric furnace; the reaction is effected like an ordinary aluminothermic or electrothermic reaction and the rest of the mixture is added by degrees. In a similar way alloys of boron can be obtained with all the metals capable of alloying with it; aluminium, nickel, cobalt, manganese, chromium, molybdenum, tungsten, vanadium, titanium, tantalum, silicon, etc.

Numerous ternary or more complex alloys may in the same way be obtained by starting from metals, from their oxides or salts, and alkaline earth borides and by applying one of the operative methods of the process above, one or other of their modifications or any combination of these methods. Amongst the constituents of these complex alloys there may be not only the metals cited above but also those such as copper, zinc, tin, antimony, lead, etc., which, when alone, do not alloy with boron.

By the phrase "metal-containing body" as used in the appended claims, is to be understood a metallic body or mass which contains the metal (or metals) to be alloyed with boron or the oxides or salts thereof, or both; and it is to be understood that the phrase "compound thereof" includes especially the salts and oxides of the metals referred to.

I claim:

1. Process for the production of alloys containing boron, consisting in mixing with a body containing metal to be alloyed with the boron, an ordinary reducing agent adapted to effect the reduction of said body and an alkaline earth boride, and then bringing this mixture while under a layer of flux, to the temperature necessary to melt the whole.

2. Process for the preparation of alloys containing boron, consisting in mixing with a body which contains in the form of oxides the metal or metals, which are to be alloyed with the boron, an ordinary reducing agent adapted to produce the reduction of said oxides, as well as an alkaline earth boride and then bringing this mixture under a layer of flux to the temperature necessary to melt the whole.

3. Process for the preparation of alloys containing boron, consisting in mixing with a body which contains in the form of salts the metal or metals, which are to be alloyed with the boron, an ordinary reducing agent adapted to produce the reduction of said salts, as well as an alkaline earth boride, and then bringing this mixture under a layer of flux to the temperature necessary to melt the whole.

JEAN LUCIEN ANDRIEUX.